(12) United States Patent  (10) Patent No.: US 6,684,144 B2
Sekii et al.                  (45) Date of Patent:    Jan. 27, 2004

(54) SPEED SHIFT CONTROL AND APPARATUS FOR CONTROL OF AUTOMATIC TRANSMISSION

(75) Inventors: Takahiro Sekii, Gothenburg (SE); Yoshihisa Yamamoto, Anjo (JP); Masamichi Unoki, Anjo (JP); Tsutomu Mizutani, Ann Arbor, MI (US)

(73) Assignee: Aisin AW Co., Ltd. (JP)

(*) Notice: Subject to any disclaimer, the term of this patent is extended or adjusted under 35 U.S.C. 154(b) by 0 days.

(21) Appl. No.: 10/116,746

(22) Filed: Apr. 5, 2002

(65) Prior Publication Data

US 2002/0160880 A1 Oct. 31, 2002

(30) Foreign Application Priority Data

Apr. 27, 2001 (JP) ........................................ 2001-131357

(51) Int. Cl.[7] .............................................. F16H 61/00
(52) U.S. Cl. .......................................... 701/51; 701/55
(58) Field of Search ............................... 701/51, 54, 55, 701/64, 87, 88, 90, 95; 477/107, 143, 154, 156

(56) References Cited

U.S. PATENT DOCUMENTS

| 5,086,666 | A  | * | 2/1992  | Moriki      |         |
|-----------|----|---|---------|-------------|---------|
| 5,882,276 | A  | * | 3/1999  | Usuki et al.| 477/120 |
| 6,067,494 | A  | * | 5/2000  | Noda et al. | 701/54  |
| 6,267,708 | B1 | * | 7/2001  | Sato et al. | 477/120 |
| 6,491,605 | B2 | * | 12/2002 | Saito et al.| 477/154 |

* cited by examiner

*Primary Examiner*—Michael J. Zanelli
(74) *Attorney, Agent, or Firm*—Lorusso, Loud & Kelly

(57) ABSTRACT

During an upshift in a full-throttle state, the output of a shift command (Us1) from a control unit is followed by a delay in initiation of an actual shift, due to a delay in increase in oil pressure, a rise in the clutch torque load, etc. A shift initiation (Uj) is determined by comparing the input rotational speed (Ni) with the product of multiplication of the output rotational speed (vehicle speed) (No) by the pre-shift gear ratio. The shift point (Mp1) is learning-corrected based on the shift initiation-time engine rotational speed (NeI). Therefore, false learning is avoided even if the engine races during a shift.

12 Claims, 8 Drawing Sheets

|   | C1 | C2 | C3 | B1 | B2 | B3 | B4 | B5 | F1 | F2 |
|---|---|---|---|---|---|---|---|---|---|---|
| N |   |   |   |   |   |   |   | ○ |   |   |
| 1ST | ○ |   |   |   |   | ◌ |   | ○ |   | ○ |
| 2ND | ○ |   |   | □ | ○ |   |   | ○ | ○ |   |
| 3RD | ○ |   |   | ○ | ○ |   | ○ |   | ○ |   |
| 4TH | ○ |   | ○ | ○ | ○ |   |   |   | ○ |   |
| 5TH | ○ | ○ | ○ |   | ○ |   |   |   |   |   |
| 3Low | ○ | ○ |   |   | ○ |   |   | ○ |   |   |
| 4Low | ○ | ○ |   |   | ○ |   | ○ |   |   |   |
| REV |   | ○ |   |   |   | ○ |   | ○ |   |   |

◌ ENGINE BRAKE OPERATION  □ ACTUATION ACCORDING TO NEEDS

*FIG.3*

BASIC CONCEPT OF SHIFT POINT LEARNING CONTROL

FIG.7(a) (PRIOR ART) CASE WHERE MAXIMUM ENGINE REVOLUTION SPEED IS APPROPRIATE WITH RESPECT TO TARGET VALUE

CASE WHERE MAXIMUM ENGINE REVOLUTION SPEED IS ABOVE TARGET VALUE

CASE WHERE MAXIMUM ENGINE REVOLUTION SPEED IS BELOW TARGET VALUE

SPEED SHIFT CONTROL AND APPARATUS FOR CONTROL OF AUTOMATIC TRANSMISSION

INCORPORATION BY REFERENCE

The disclosure of Japanese Patent Application No. 2001-131357 filed on Apr. 27, 2001, including the specification, drawings and abstract, is incorporated herein by reference in its entirety.

BACKGROUND OF THE INVENTION

1. Field of the Invention

The present invention relates to method and apparatus for speed shift control of an automatic transmission installed together with an engine in a vehicle. More particularly, the invention relates to a learning control of a speed shift point in a power-on upshift and, particularly, an upshift in response to a demand for maximum engine output (a fully open throttle state).

2. Description of the Related Art

Generally in an automatic transmission, a speed shift determination is output based on a map (speed shift diagram) pre-determined for vehicle speed versus engine output demand (generally, the degree of throttle opening). With regard to a speed shift during a fully open throttle state where the maximum engine output is requested, it is desirable that the engine rotational speed be equal to an allowable maximum rotational speed. In some cases, however, the engine rotational speed does not reach the allowable maximum rotational speed, or exceeds the allowable maximum rotational speed (generally termed over-revolution), due to variations between individual engines and automatic transmissions introduced in manufacture, engine torque reduction due to deterioration of the engine with age, the engine intake temperature, the intake pressure, etc.

A conventional countermeasure against the aforementioned problem is disclosed in Japanese Patent Publication No. HEI 7-23745. According to that disclosure, a maximum value of the engine rotational speed during a speed shift is detected, and the shift point is changed and corrected so that the maximum engine rotational speed reaches a pre-set reference value. Japanese Patent Publication No. HEI 7-23745 teaches that the engine rotational speed is calculated by multiplying a detected value of the rotational speed of the output shaft of the automatic transmission by the gear ratio (see claim 5). This prior disclosed control method is merely one example of an engine rotational speed detecting method in which the engine rotational speed is not directly detected, and which attempts to determine a maximum engine rotational speed.

However, in the case of what is generally termed a clutch-to-clutch shift, in which a predetermined speed stage is achieved by engaging one friction engagement element while disengaging another friction engagement element, if the engagement timing of the engaging-side friction engagement element is delayed relative to the release timing of the releasing-side friction engagement element, there occurs a state where both of the friction engagement elements are released, and therefore the engine races. If, in such a case, the shift point is corrected by the maximum engine rotational speed, the racing engine rotational speed is used as a reference to correct the shift point.

As indicated in FIGS. 7(a) to 7(c), when the throttle is opened for an upshift (power-on upshift), a shift determination command Us1 is output at a shift point Mp1 in a map based on the vehicle speed (No) and the degree of throttle opening. However, due to the time required for piston stroke of a hydraulic servo and the like, the actual speed shift performed by the switch of engagement of the friction engagement elements is delayed, and therefore the engine rotational speed Ne1 continues to rise. In response to the actual upshift, the engine rotational speed drops so as to correspond to the gear ratio of the post-shift speed stage. After that, the engine rotational speed increases in accordance with the degree of throttle opening.

If the maximum engine rotational speed Nemax is within a pre-set range of target engine rotational speed (set range) NeK±β as indicated in FIG. 7(a), the shift point Mp1 is not corrected, i.e., it is maintained as is. If the maximum engine rotational speed Ne1max is higher than the target engine rotational speed NeK±β as indicated in FIG. 7(b), it is considered that the engine speed may reach or exceed an allowable rotational speed (generally termed red zone), and therefore the learning correction is performed in such a direction as to advance the timing of the shift point (Mp1→Mp2). As a result, at the time of the next speed shift, a shift determination command Us2 is output based on the learning-corrected shift point Mp2. Therefore, the actual speed shift by the switch of engagement of the friction engagement elements occurs earlier, so that the maximum rotational speed Ne2max of the engine rotational speed Ne2 after the correction comes within the target range for engine rotational speed NeK±β, as indicated by a broken line in FIG. 7(b).

If the maximum engine rotational speed Ne1max is below the target engine rotational speed NeK±β as indicated in FIG. 7(c), it is determined that the actual engine output is below that corresponding to the fully open throttle, and learning correction is performed in a direction to delay the shift point (Mp1→Mp2). As a result, at the next speed shift, a shift determination command Us2 is output based on the learning-corrected shift point Mp2. Therefore, the actual speed shift by switch of the engagement of friction engagement elements occurs at a retarded timing, so that the maximum rotational speed Ne2max for the engine rotational speed Ne2 after the correction comes within the range for target engine rotational speed NeK±β, as indicated by a broken line in FIG. 7(c).

In a normal case, a correction is made so that the maximum engine rotational speed reaches a target rotational speed even if the learning-correction of the shift point is performed based on the maximum engine rotational speed, as mentioned above. However, as indicated in FIG. 8, if the engine races, that is, if the engaging timing of a friction engagement element is delayed relative to the release timing of a friction engagement element, so that the engine is in a nearly no-load state, the engine rotational speed Ne3 rises at a sharp angle so that the maximum engine rotational speed Ne3max becomes high above the range of the target engine rotational speed NeK±β. Then, on the basis of the aforementioned learning-correction (see FIG. 7(b)), it is determined that the actual speed shift is late, and a learning-correction is made in a direction to advance the shift point in timing (Mp1→Mp2) as indicated by a broken line, despite the rise of the engine rotational speed Ne3 caused by the engine racing. As a result, the next speed shift is conducted upon the shift determination command Us2 based on the learning-corrected shift point Mp2. Therefore, the post-correction engine rotational speed Ne2 becomes as shown in FIG. 8 (the dot-dash line), and the maximum rotational speed Ne2max falls below the target engine rotational speed NeK±β.

Thus, the learning-correction of the shift point based on the maximum value of engine rotational speed may result in a false correction if engine racing occurs. The engine racing occurs randomly depending on the clutch-to-clutch shift timing. Therefore, at the next speed shift at a normal timing, the engine rotational speed may fail to reach an allowable maximum rotational speed, so that the maximum output cannot be produced.

SUMMARY OF THE INVENTION

Accordingly, it is an object of the invention to provide a method and apparatus for speed shift control of an automatic transmission, with learning-correction even if the engine should race, by detecting the engine rotational speed occurring at the time of initiation of an actual speed shift.

The present invention provides a control apparatus for control of a speed shift in an automatic transmission which is performed responsive to a predetermined shift condition. The control apparatus includes a speed shift determining means for outputting a speed shift determination responsive to satisfaction of the predetermined speed shift condition. Speed shift executing means executes an actual speed shift based on the output speed shift determination and shift initiation-time engine rotational speed detecting means determines the time at which the actual execution of the speed shift is initiated and further detects the engine rotational speed at the time of the initiation of the speed shift. Learning-correcting means corrects the predetermined speed shift condition by comparing the engine rotational speed at the time of initiation of the speed shift with a target engine rotational speed.

In the preferred embodiments, the shift initiation-time engine rotational speed detecting means compares an input rotational speed of the automatic transmission with a value obtained by multiplying an output rotational speed of the automatic transmission by a gear ratio of a pre-shift speed stage.

The control apparatus may include a shift map of vehicle speed versus engine output demand, with vehicle shift speeds plotted thereon. In embodiments including such a map, the learning-correcting means corrects a vehicle shift speed read from the map in such a direction as to decrease the vehicle shift speed if the engine rotational speed at the time of initiation of the shift speed is greater than the target engine rotational speed. On the other hand, if the engine rotational speed at the time of initiation of the speed shift is less than the target engine rotational speed, the learning-correcting means corrects the vehicle shift speed by increasing same. Preferably, these corrections are made by increasing or reducing, as the case may be, a correction value for the vehicle shift speed, by a predetermined amount each control cycle.

The present invention also provides a method for speed shift control of an automatic transmission in which a speed shift is performed based on a predetermined speed shift condition. The method includes outputting a speed shift command responsive to satisfaction of the predetermined shift speed condition, executing an actual speed shift responsive to the speed shift command and determining the time at which the actual execution of the speed shift is initiated. Further, the method involves detecting the engine rotational speed at the determined time of initiation of the speed shift and correcting the predetermined speed shift condition by comparing the engine rotational speed at the time of initiation of the speed shift with a target engine rotational speed.

The determination of the time at which the actual execution of the speed shift is initiated may be made by comparing the input rotational speed of the automatic transmission with a value obtained by multiplying an output rotational speed of the automatic transmission by the gear ratio of the pre-shift speed range.

Determination of satisfaction of the speed shift condition may be by reference to a shift map of vehicle speed versus engine output demand, with vehicle shift speeds plotted thereon. The vehicle shift speed read from the map may be corrected by decreasing same if it is determined that the engine rotational speed at the time of initiation of the speed shift is greater than the target engine rotational speed. On the other hand, the correction increases the vehicle shift speed if it is determined that the engine rotational speed at the time of initiation of the speed shift is less than the target engine rotational speed. Preferably, the correcting increases or reduces a correction value for the vehicle shift speed by a predetermined amount each control cycle.

One preferred application of the method of the present invention is to an upshift executed responsive to a demand for maximum engine output.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 is a table of operations of the automatic transmission;

FIGS. 7(a) to 7(c) are time charts of operations performed during a normal state in accordance with the conventional art (which is utilized in the shift control in the invention if the maximum engine rotational speed Nemax is replaced by the shift initiation-time engine rotational speed NeI), wherein FIG. 7(a) indicates a case where the maximum engine rotational speed is appropriate with respect to a target value, and FIG. 7(b) indicates a case where the maximum engine rotational speed is greater than a target value, and FIG. 7(c) indicates a case where the maximum engine rotational speed is below the target value.

DETAILED DESCRIPTION OF PREFERRED EMBODIMENTS

A preferred embodiment of the invention will now be described with reference to the accompanying drawings.

Figure 2:
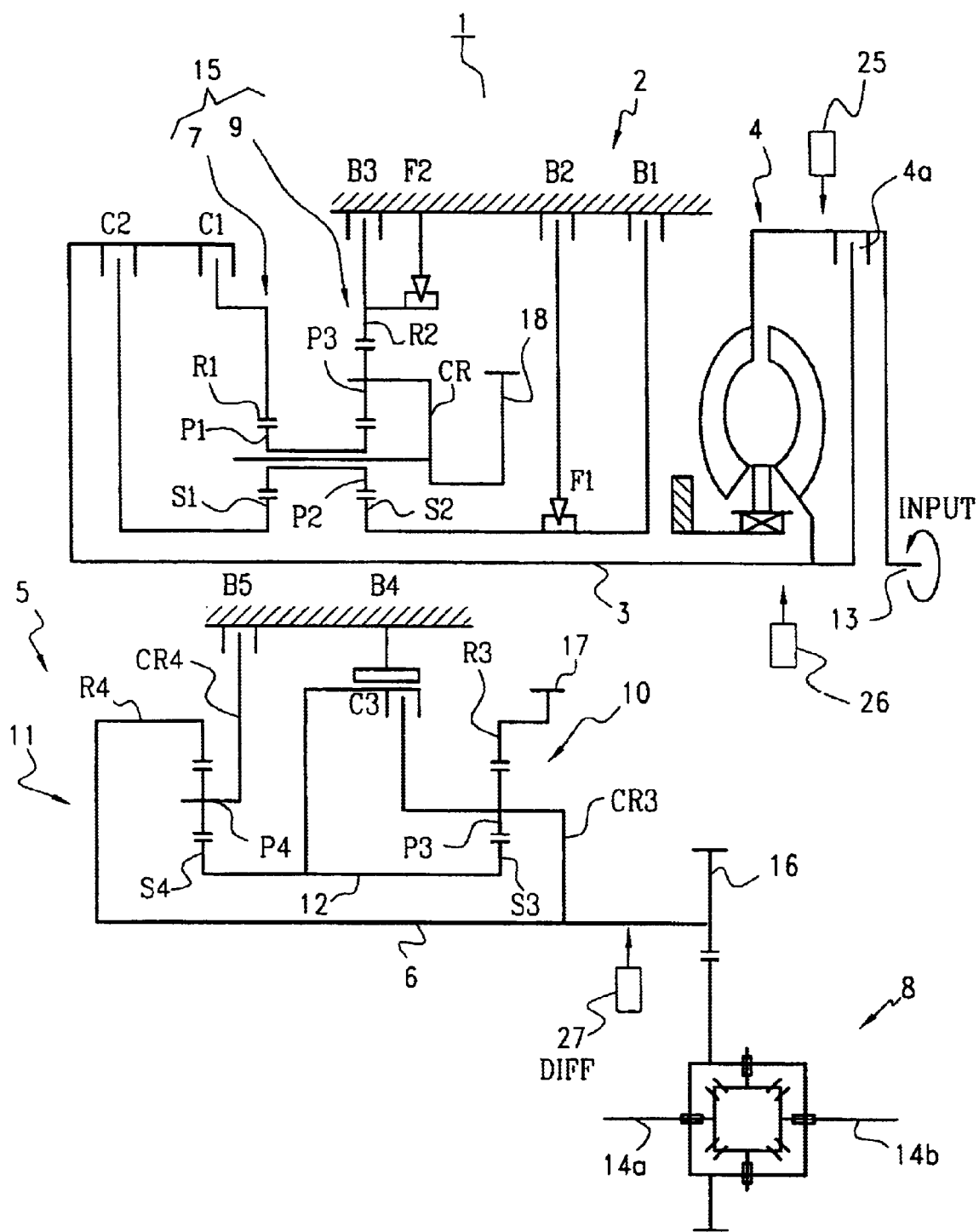
FIG. 2 is a skeletal diagram illustrating an automatic transmission to which the invention is applicable.

As shown in FIG. 2, a 5-speed automatic transmission 1 includes a torque converter 4, a 3-speed main shift mechanism 2, a 3-speed subsidiary shift mechanism 5, and a differential 8. These units are interconnected and disposed within a integrally formed case. The torque converter 4 includes a lockup clutch 4a. The torque converter 4 inputs power from an engine crankshaft 13 to an input shaft 3 of the main shift mechanism 2 via fluid within the torque converter or via mechanical connection by the lockup clutch. The integral case rotatably supports a first shaft 3 (specifically, the input shaft) aligned with the crankshaft, a second shaft 6 (counter shaft) parallel to the first shaft 3 and a third shaft (left and right-side axles) 14a, 14b. A valve body is disposed on the outer side of the case.

The main shift mechanism 2 has a planetary gear unit 15 that includes simple planetary gearing 7 and double-pinion planetary gearing 9. The simple planetary gearing 7 includes a sun gear S1, a ring gear R1, and a carrier CR supporting pinions P1 meshed with the sun gear S1 and the ring gear R1. The double-pinion planetary gearing 9 includes a sun gear S2 having a number of teeth that is different from that of the sun gear S1, a ring gear R2, and the common carrier CR supporting pinion P2 meshed with the sun gear S2 and pinion P3 meshed with the ring gear R2 as well as the pinion P1 of the simple planetary gearing 7.

The input shaft 3 drivingly connected to the engine crankshaft 13 via the torque converter 4 is connectable to the ring gear R1 of the simple planetary gearing 7 via an input (forward) clutch C1, and is also connectable to the sun gear S1 of the simple planetary gearing 7 via a second (direct) clutch C2. The sun gear S2 of the double-pinion planetary gearing 9 is directly stoppable by a first brake B1, and is also stoppable by a second brake B2 via a first one-way clutch F1. Furthermore, the ring gear R2 of the double-pinion planetary gearing 9 is stoppable by a third brake B3 and a second one-way clutch F2 disposed in parallel with the third brake B3. The common carrier CR is connected to a counter drive gear 18 that serves as an output member of the main shift mechanism 2.

The subsidiary shift mechanism 5, on the other hand, includes an output gear 16, a first simple planetary gear unit 10 and a second simple planetary gear unit 11 that are disposed in an axial sequence in that order toward the rear, in parallel with the counter shaft 6, i.e., the second shaft. The counter shaft 6 is rotatably supported by the integral case via a bearing. The first and second simple planetary gear units 10, 11 are the Simpson type.

In the first simple planetary gear 10, a ring gear R3 is connected to a counter driven gear 17 meshed with the counter drive gear 18, and a sun gear S3 is connected to a sleeve shaft 12 that is rotatably supported on the counter shaft 6. Furthermore, pinion P3 is supported by a carrier CR3 that is formed as a flange that is firmly connected to the counter shaft 6. The carrier CR3 supporting the pinion P3 at the opposite end thereof is connected to an inner hub of a UD direct clutch C3. In the second simple planetary gear unit 11, a sun gear S4 is formed on the sleeve shaft 12, and is therefore connected to the sun gear S3 of the first simple planetary gear unit. A ring gear R4 of the second simple planetary gear unit 11 is connected to the counter shaft 6.

The UD direct clutch C3 is disposed between the carrier CR3 of the first simple planetary gear unit and the interconnected sun gears S3, S4. The interconnected sun gears S3, S4 are stoppable by a fourth brake B4 that is a hand brake. A carrier CR4 supporting pinion P4 of the second simple planetary gear unit is stoppable by a fifth brake B5.

Next, operation of the mechanical portion of the 5-speed automatic transmission will be described with reference to FIGS. 2 and 3.

In a first speed (1ST) state in a D (drive) range, the forward clutch C1 is connected and the fifth brake B5 and the second one-way clutch F2 are engaged, so that the ring gear R2 of the double-pinion planetary gear unit and the carrier CR4 of the second simple planetary gear unit 11 are held against rotation (stopped). In this state, rotation of the input shaft 3 is transferred to the ring gear R1 of the simple planetary gear unit via the forward clutch C1. Furthermore, since the ring gear R2 of the double-pinion planetary gear unit is stopped, the common carrier CR is forwardly rotated at a considerably reduced speed while the sun gears S1, S2 are reversely rotated. That is, the main shift mechanism 2 is in the first speed state, and the reduced-speed rotation is transferred to the ring gear R3 of the first simple planetary gear unit of the subsidiary shift mechanism 5 via the counter gears 18, 17. The subsidiary shift mechanism 5 is in a first speed state wherein the carrier CR4 of the second simple planetary gear unit is stopped by a fifth brake B5. The reduced-speed rotation of the main shift mechanism 2 is further reduced in speed by the subsidiary shift mechanism 5, and is output from the output gear 16.

In second speed (2ND), the second brake B2 (and the first-brake B1) is operated in addition to the forward clutch C1. Furthermore, the engagement of the second one-way clutch F2 is switched (disengaged) to engagement of the first one-way clutch F1, and the fifth brake B5 is kept in the engaged state. In this state, the sun gear S2 is stopped by the second brake B2 and the first one-way clutch F1. Therefore, rotation of the ring gear R1 of the simple planetary gear unit, transferred from the input shaft 3 via the forward clutch C1, turns the carrier CR at a reduced speed in the forward direction while idling the ring gear R2 of the double-pinion planetary gear unit in the forward direction. Furthermore, The reduced-speed rotation is transferred to the subsidiary shift mechanism 5 via the counter gears 18, 17. That is, the main shift mechanism 2 is in a second speed state, and the subsidiary shift mechanism 5 is in the first speed state due to the engagement of the fifth brake B5. This combination of the second speed state and the first speed state achieves a second speed overall for the entire automatic transmission 1. Although in this case, the first brake B1 can be put into an actuated state, the first brake B1 is released when the second speed is established for coast-down.

In third speed (3RD), the forward clutch C1, the second brake B2, the first one-way clutch F1 and the first brake B1 are kept in the engaged state. Furthermore, the fifth brake B5 is released and the fourth brake B4 is engaged. That is, the main shift mechanism 2 is kept in the same state as in second speed, and the second-speed rotation is transferred to the subsidiary shift mechanism 5 via the counter gears 18, 17. In the subsidiary shift mechanism 5, rotation from the ring gear R3 of the first simple planetary gear unit is output as second-speed rotation from the carrier CR3 due to the fixation of the sun gear S3 and the sun gear S4. Therefore, the combination of second speed of the main shift mechanism 2 and the second speed of the subsidiary shift mechanism 5 achieves an overall third speed for the automatic transmission 1 as a whole.

In fourth speed (4TH), the main shift mechanism 2 is in the same state as in second speed and third speed, in which the forward clutch C1, the second brake B2, the first one-way clutch F1 and the first brake B1 are engaged. In the subsidiary shift mechanism 5, the fourth brake B4 is released and the UD direct clutch C3 is engaged. In this state, the carrier CR3 of the first simple planetary gear unit and the sun gears S3, S4 are connected, thereby achieving locked-up rotation in which the planetary gear units 10, 11 rotate together. Therefore, the combination of the second speed of the main shift mechanism 2 and the locked-up state (third speed) of the subsidiary shift mechanism 5 serves to output fourth-speed rotation from the output gear 16, as the output of the entire automatic transmission.

In fifth speed (5TH), the forward clutch C1 and the direct clutch C2 are engaged, so that rotation of the input shaft 3 is transferred to the ring gear R1 and the sun gear S1 of the simple planetary gear unit. Thus, the main shift mechanism 2 produces locked-up rotation in which the gear units rotate together. In this state, the first brake B1 is released, and the second brake B2 is kept in the engaged state, and the first one-way clutch F1 idles. Therefore, the sun gear S2 idles. Furthermore, the subsidiary shift mechanism 5 is in the locked-up state in which the UD direct clutch C3 is engaged. Therefore, the third speed (locked-up state) of the main shift mechanism 2 and the third speed (locked-up state) of the subsidiary shift mechanism 5 combine to output fifth-speed rotation from the output gear 16, for the entire automatic transmission.

Furthermore, this automatic transmission provides intermediate speed stages that are put into operation during downshifts such as in acceleration, that is, a third speed-low and a fourth speed-low.

In the third speed-low state, the forward clutch C1 and the direct clutch C2 are engaged (although the second brake B2 is in the engaged state, the second brake B2 is overrun due to the first one-way clutch F1). Thus, the main shift mechanism 2 is in third speed in which the planetary gear unit 15 is locked up. The subsidiary shift mechanism 5 is in first speed with the fifth brake B5 engaged. The third speed state of the main shift mechanism 2 and the first speed state of the subsidiary shift mechanism 5 combine to output a speed stage having a gear ratio that is between the second and third speeds, for the automatic transmission 1 as a whole.

In the fourth speed-low state, the forward clutch C1 and the direct clutch C2 are engaged. Thus, the main shift mechanism 2 is in the third speed (locked-up) state as in the third speed-low state. The subsidiary shift mechanism 5 is in the second speed state wherein the fourth brake B4 is engaged and the sun gear S3 of the first simple planetary gear unit 10 and the sun gear S4 of the second simple planetary gear unit 11 are fixed. Therefore, the third speed state of the main shift mechanism 2 and the second speed state of the subsidiary shift mechanism 5 combine to output a speed stage between the third speed and the fourth speed.

In FIG. 3, a dot-line circle indicates engine braking in coasting(4th, 3rd or 2nd range). That is, during the first speed, the third brake B3 is actuated to prevent rotation of the ring gear R2 due to overrun of the second one-way clutch F2. Furthermore, during the second speed, the third speed and the fourth speed, the first brake B1 is actuated to prevent rotation of the sun gear S1 due to overrun of the first one-way clutch F1.

In R (reverse) range, the direct clutch C2 and the third brake B3 are engaged, and the fifth brake B5 is engaged. In this state, rotation of the input shaft 3 is transferred to the sun gear S1 via the direct clutch C2. Furthermore, since the ring gear R2 of the double-pinion planetary gear unit is held against rotation by the third brake B3, the carrier CR is reversely rotated while the ring gear R2 of the simple planetary gear unit is reversely rotated. The reverse rotation is transferred to the subsidiary shift mechanism 5 via the counter gears 18, 17. In the subsidiary shift mechanism 5, the carrier CR4 of the second simple planetary gear unit is stopped in reverse as well due to the fifth brake B5, and is therefore held in the first speed state. Therefore, the reverse rotation of the main shift mechanism 2 and the first-speed rotation of the subsidiary shift mechanism 5 combine to output reduced-speed reverse rotation from the output gear 16.

Figure 4:
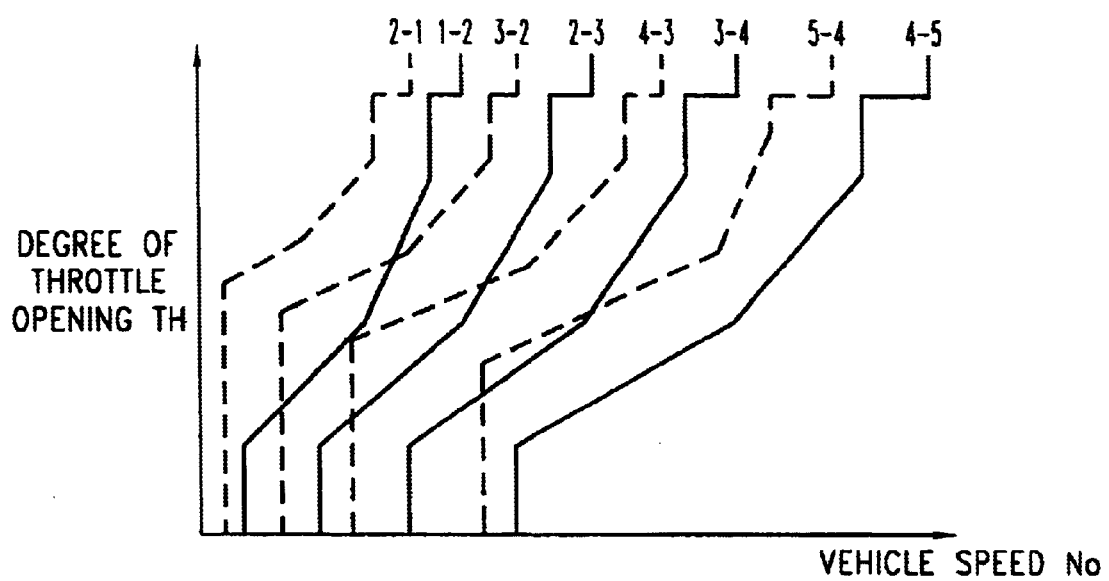
FIG. 4 is a shift map.

FIG. 4 is a speed shift map (shift diagram) stored in the control unit U in which a shift point is determined as a function of the vehicle speed, that is, the output shaft rotational speed No, and the degree of throttle opening TH, that is, the engine load (demanded output). In the diagram, solid lines indicate upshifts, and dotted lines indicate downshifts. A shift determination (command) is output when any one of the lines is crossed. For example, in a case where the vehicle is accelerated while the degree of throttle opening TH is kept constant, upshift signals (shift determinations) are output as 1→2, 2→3, 3→4, 4→5 in the automatic transmission every time the vehicle speed increases and crosses a solid line. In a case where the accelerator pedal is rapidly depressed, an upshift signal is likewise output when a solid line is crossed. Conversely, if the accelerator pedal is released or if the vehicle is decelerated by depressing the brake or the like, downshift signals are output with reference to the dotted lines.

In the automatic transmission 1, what is generally termed a clutch-to-clutch shift is performed for the 2←→3 and 3←→4 shifts. Specifically, for the 2←→3 shift, the fifth brake B5 is released and the fourth brake B4 is engaged (for the 3→2 shift, the engaging and releasing elements are reversed). For the 3→4 shift, the fourth brake B4 is released and the third clutch C3 is engaged (for the 4→3 shift, the engaging and releasing elements are reversed).

In a clutch-to-clutch shift, for example, the 2→3 shift, a shift valve of a hydraulic circuit (not shown) is switched in accordance with a shift determination based on the shift map, and the engaging force on the fourth brake starts to increase simultaneously with the start of decrease in the engaging force on the fifth brake B5. While the second-speed is maintained, the fourth brake B5 is slipping while transferring torque based on friction (torque phase). When the torque capacity of the brake B5 exceeds the engine torque, the engine torque is surpassed by the torque capacity of the brake B5, and the engine rotational speed decreases in such a manner as to compensate for the difference between the engine torque and the torque capacity of the brake B5. When the difference between the rotational speeds becomes null, the shift is completed (inertia phase).

Figure 1:
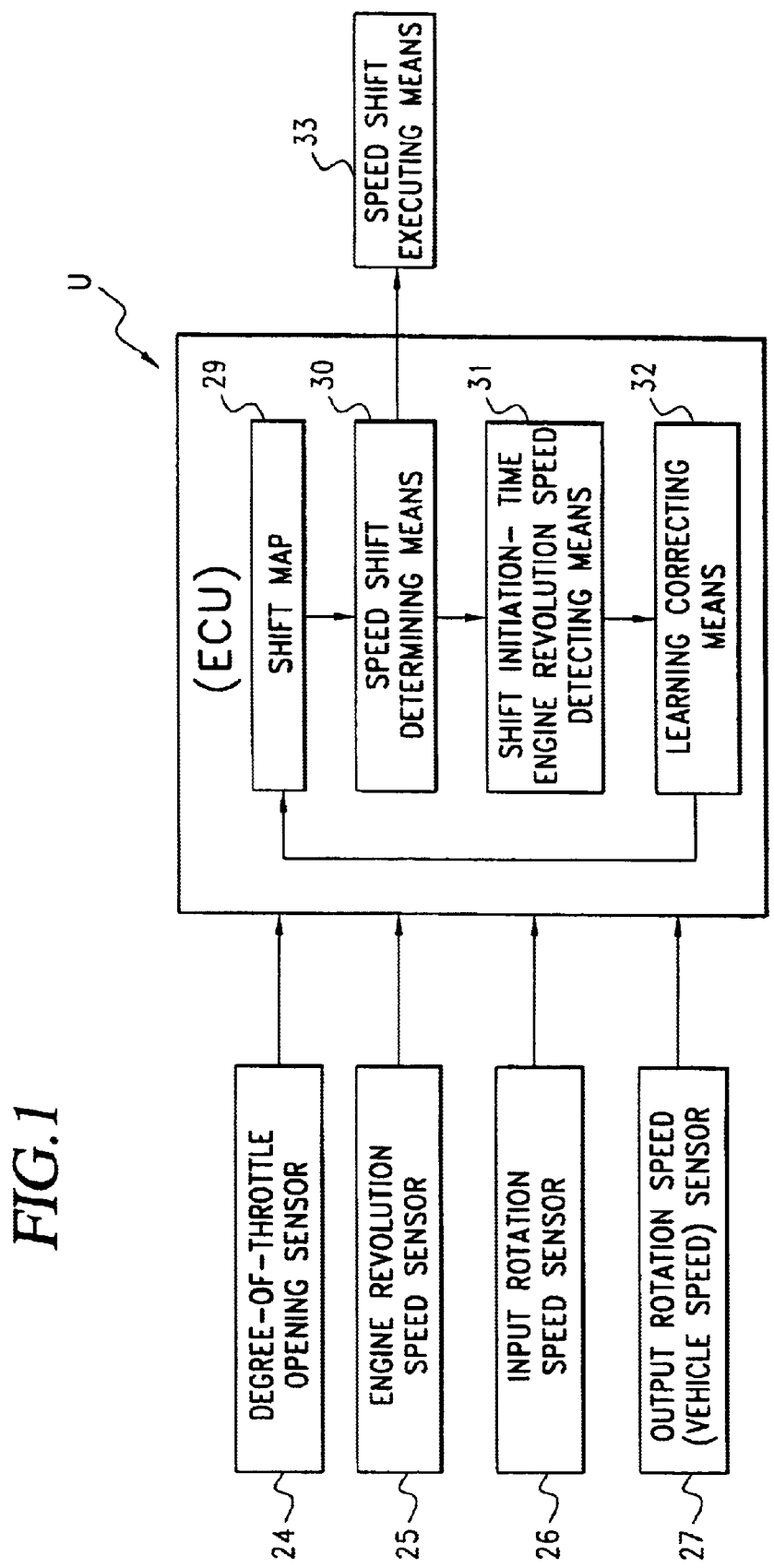
FIG. 1 is a block diagram of a shift control apparatus in accordance with the invention.

FIG. 1 is a block diagram of a control apparatus in accordance with the present invention, which includes a control unit (ECU) U in the form of a vehicle-installed computer. The control unit U receives inputs in the form of signals from a degree-of-throttle opening sensor 24, an engine rotational speed sensor 25, an input rotational speed sensor 26, and an output rotational speed (vehicle speed) sensor 27. The control unit U outputs electric signals to solenoid valves of a speed shift executing means 33, formed by a hydraulic circuit, for performing the actual shift operations of the automatic transmission. The control unit U includes a speed shift determining means 30 for outputting a shift determination in accordance with a sensed value of a shift map 29, a shift initiation-time engine rotational speed detecting means 31 for determining the time at which the actual speed shift based on the speed shift executing means 33 is initiated, and for detecting the engine rotational speed at the time of initiation of the speed shift, and a learning-correcting means 32 for correcting the speed shift condition by comparing the engine rotational speed at the time of initiation of the speed shift with a target engine rotational speed. Operation of these components will be described in detail below with reference to the flowchart of FIG. 5 and the time chart of FIG. 6.

The speed shift control apparatus in accordance with the invention will now be described with reference to FIGS. 5 and 6.

Figure 5:
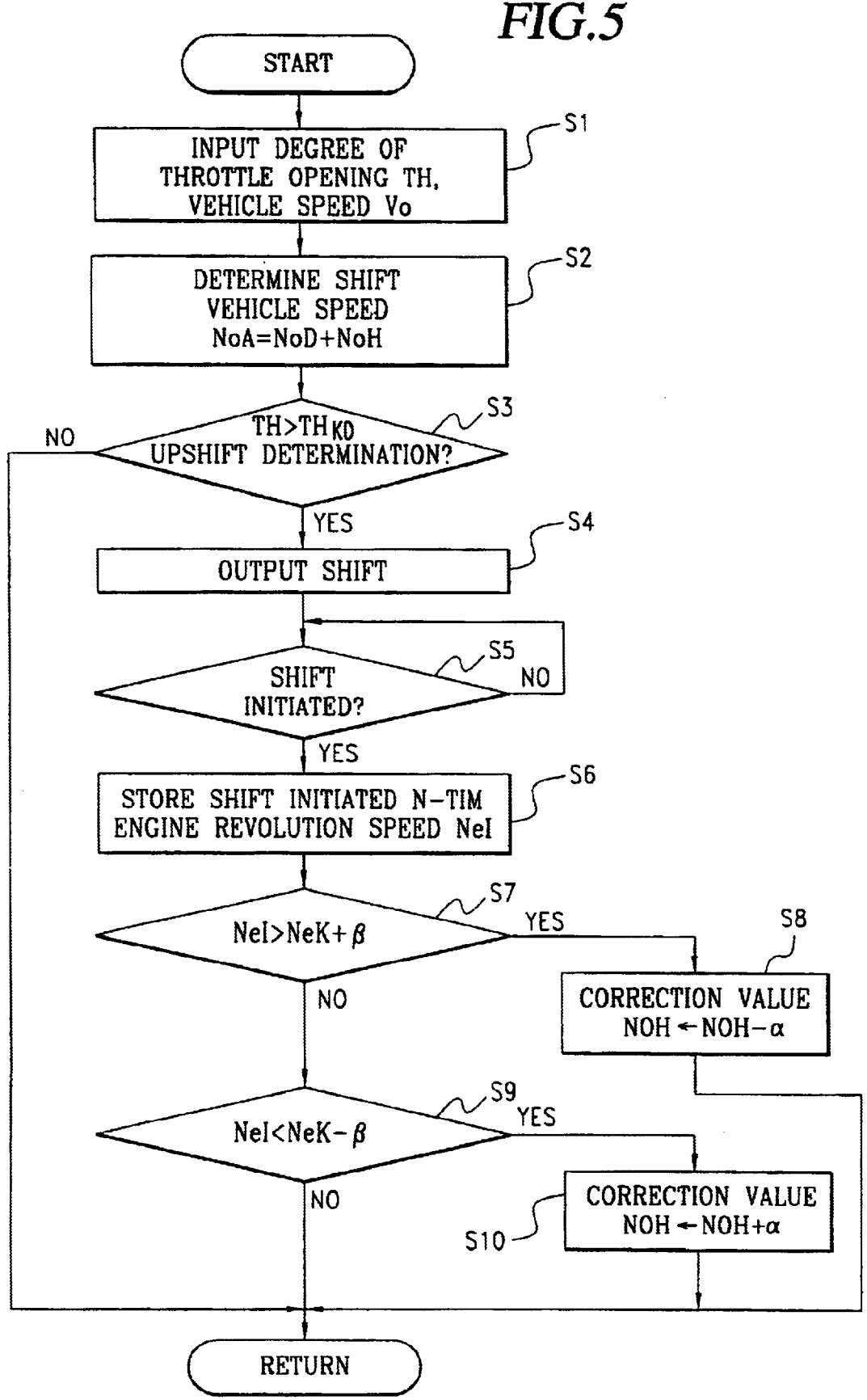
FIG. 5 is a flowchart of a shift control routine in accordance with the method of the present invention.
Figure 6:
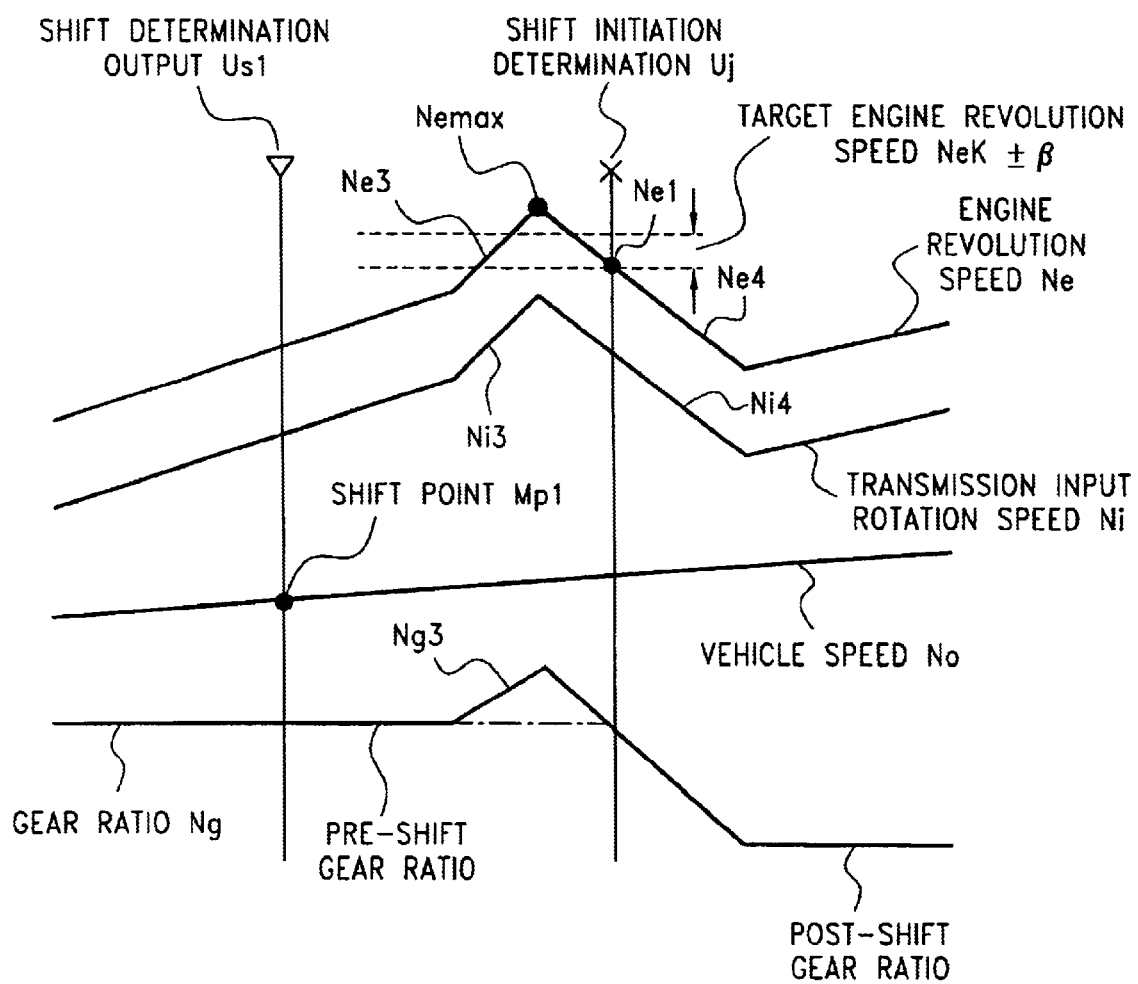
FIG. 6 is a time chart indicating shift control in accordance with the invention performed when racing of the engine occurs.

Referring to the flowchart of FIG. 5, first, the degree of throttle opening TH and the vehicle speed No are input based on the degree-of-throttle opening sensor 24 and the vehicle speed (output shaft rotational speed) sensor 25 (S1). Then, a shift vehicle speed NoA is determined by adding a correction value NoH to a reference vehicle speed NoD read from the shift map 29 (set for each kind of shift as indicated in FIG. 4) (NoA=NoD+NoH) (S2).

Next, a determination is made regarding an upshift (e.g., the 2→3 shift) in a (power-on) state in which the accelerator pedal is depressed to open the throttle and, in particular, a state (kick-down) in which the throttle is fully open and the maximum engine output is demanded (S3). That is, it is determined whether the degree of throttle opening TH is a kick-down degree of throttle opening $TH_{KD}$, i.e., approximately 100[%] (TH>$TH_{KD}$) and the shift determination is an upshift command. The upshift is determined as a crossing of a solid line from the left side to the right side in the shift map of FIG. 4. This determination is made provided that the present vehicle speed No is greater than the shift vehicle speed NoA determined in step S2 (No>NoA), that is, the vehicle speed No rises diagonally rightward in the time chart of FIG. 6.

In the case of "YES" at step S3 (i.e., the upshift determination based on kick-down), the control unit U outputs a shift determination Us1 for an upshift (S4). In the case of "NO", the process is returned without execution of the shift control. The shift determination Us1 in the step S4 is output based on a shift point Mp1 corrected (NoH) by the previous learning control (see FIG. 6). The output signal is an electric signal that acts on a solenoid valve in the hydraulic circuit (not shown) whereby the solenoid valve is actuated. On the basis of the oil pressure from the solenoid valve, shift valves are switched so as to change the oil pressure on the hydraulic servos of two friction engagement elements such as the fourth and fifth brakes or the like. Therefore, after the shift determination is output, the actual shift (the aforementioned inertia phase) does not immediately start; rather, there is a time delay due to a delay of change in oil pressure, an increase in the torque on a friction engagement element, etc. During this delay, the automatic transmission is maintained in the pre-shift speed stage (e.g., the second speed), and the input shaft rotational speed Ni rises as the engine rotational speed Ne rises.

The aforementioned shift determination of upshift is concerned with a clutch-to-clutch shift, such as the 2→3 shift, the 3→4 shift, etc. In some cases, the releasing timing of the releasing-side friction engagement element (e.g., the fifth brake B5 in the 2→3 shift) and the engaging timing of the engaging-side friction engagement element (e.g., the fourth brake B4) do not match due to variations in the piston strokes of the hydraulic servos and the like. In particular, the engaging timing may be excessively late relative to the releasing timing, in which case the engine races as indicated in FIG. 6. The rise Ne3 in the engine rotational speed Ne due to the racing propagates to the input shaft 3 via the torque converter 4, so that the input shaft rotational speed Ni rises approximately in the same fashion (Ni3). After that, the torque borne by the engaging-side friction engagement element increases, the engine load increases, and the engine rotational speed decreases (Ne4). Therefore, the input shaft rotational speed also decreases (Ni4).

It is next determined in step S5 whether the actual speed shift is initiated, that is, whether the torque phase has been completed and the inertia phase initiated. This shift initiation determination Uj is made if the input shaft rotational speed Ni determined by the engine rotational speed sensor 25 becomes less than a value obtained by subtracting a predetermined value C (set by factoring in a detection error) from the multiplication product of the gear ratio G of the pre-shift speed stage (e.g., the second speed) in this speed shift and the vehicle speed (output shaft rotational speed) No determined by the sensor 27 (Ni<G×No−C). In FIG. 6, the gear ratio Ng calculated based on the vehicle speed (output shaft rotational speed) No and the gear ratio G is constant as the vehicle speed No is approximately constant. However, a gear ratio change Ng3 may occur due to the engine racing and, although the gear ratio change Ng3 caused by the racing of the engine may be a change started from the gear ratio of the pre-shift speed stage, this gear ratio change is not a change toward the gear ratio of the target speed stage, but rather it is gear ratio change in the opposite direction toward another speed stage. Therefore, the shift initiation determination Uj is specific to the point in time of initiation of a gear ratio change from the pre-shift speed stage to the target speed stage, and does not include a gear ratio change opposite from that of the target speed stage.

Figure 7B:
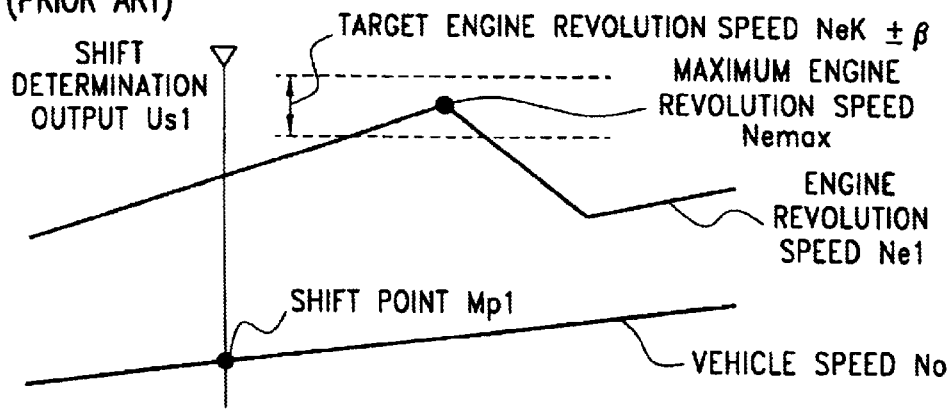
Figure 7B:
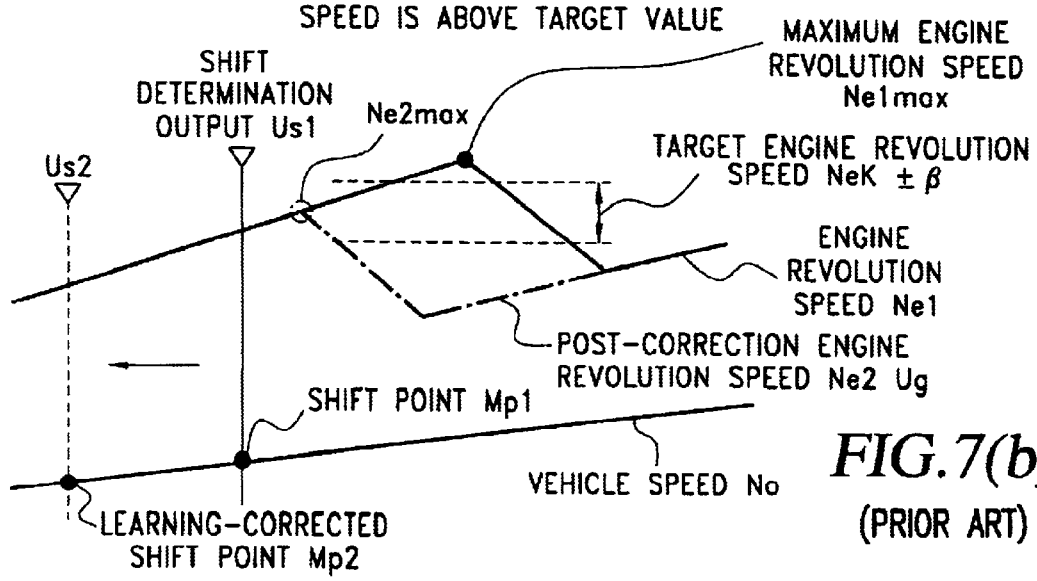

If shift initiation is determined ("YES" at step S5), the engine rotational speed NeI at the initiation of the speed shift is detected by the engine rotational speed sensor 25, and is stored. Subsequently, the stored engine rotational speed NeI is compared with a target engine rotational speed (NeK+β) obtained by adding a predetermined dead band β to the maximum allowable engine rotational speed NeK (S7). If the stored engine rotational speed NeI is above the range of target engine rotational speed NeK+β ("YES"), the correction value NoH is reduced by a correction value α of a predetermined rotational speed to determine a correction value NoH for the next cycle (S8) as indicated in FIG. 7(b) (where the maximum engine rotational speed Ne1max is replaced by the shift initiation-time engine rotational speed NeI).

Figure 7C:
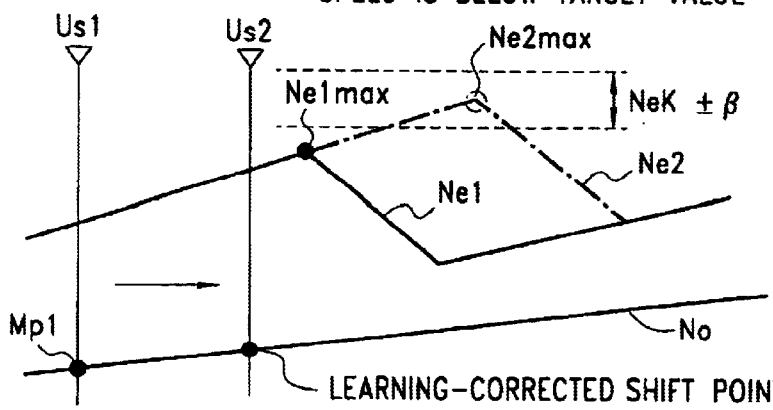

Conversely, if the determination in step S7 is "NO", the stored engine rotational speed NeI is compared with a target engine rotational speed (NeK−β)obtained by subtracting the predetermined dead band β from the allowable maximum engine rotational speed NeK (S9). If the stored engine rotational speed is less than the target engine rotational speed NeK−β ("YES"), the correction value NoH is increased by the correction value α of the predetermined rotational speed to determine a correction value NoH for the next cycle (S10) as indicated in FIG. 7(c) (where the maximum engine rotational speed Ne1max is replaced by the shift initiation-time engine rotational speed NeI). That is, if the engine rotational speed NeI at the time of initiation of a shift is outside the target engine rotational speed range NeK±β, the shift point related to the vehicle speed No is learning-corrected by a predetermined amount α in each execution of the shift control routine.

If the determination is "NO" in steps S7 and S9, that is, if the shift initiation-time engine rotational speed NeI is within the range of the target engine rotational speed NeK±β, the correction value NoH is maintained as indicated in FIG. 7(a) (where the maximum engine rotational speed Nemax is replaced by the shift initiation-time engine rotational speed NeI). The new correction value NoH obtained by the learning correction is used to change the vehicle speed-side shift point in the shift map (Mp1→Mp2) in step S2. Therefore, in the next cycle of the shift control (the upshift control related to a predetermined clutch-to-clutch shift caused by a kick-down), the shift determination Us2 which is output based on the new shift point Mp2.

Figure 8:
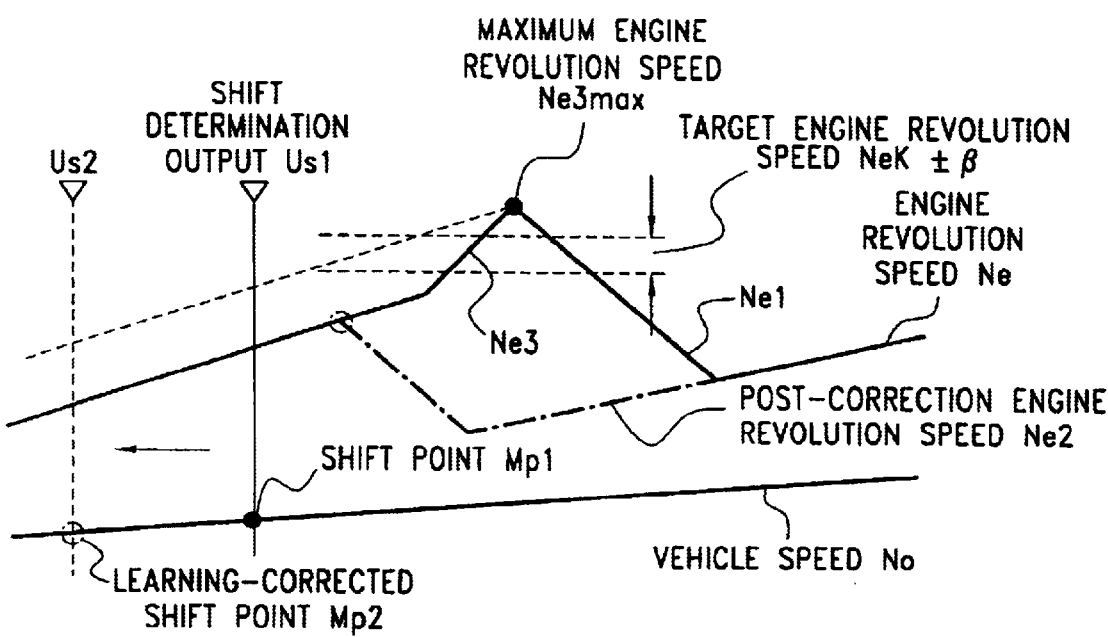
FIG. 8 is a time chart of a shift operation in accordance with the conventional art, wherein the racing of the engine occurs.

In a conventional shift control based on the maximum engine rotational speed Nemax, if the engine races, learning correction can not be appropriately performed, and the shift point Mp2 may deviate from a desired value (vehicle speed) as indicated in FIG. 8. However, in the shift control based on the shift initiation-time engine rotational speed NeI in accordance with the present invention, even if the engine races (Ne), the effect of the racing is excluded, so that the learning control of the shift point can always be made correctly. For example, as long as the engine rotational speed NeI at the time of the shift initiation control Uj is within the range of the target engine rotational speed NeK±β as indicated in FIG. 6, the shift point Mp1 is not changed even if the maximum engine rotational speed Nemax should exceed the range NeK±β due to the racing of the engine.

The conventional learning control, including the aforementioned Japanese HEI 7-23745, does not include determination of an engine rotational speed at the time of initiation of a speed shift.

Although the above-described embodiment has been described in connection with an upshift caused by a kick-down, the present invention is not limited to application to a full-throttle state, but is also applicable to a power-on upshift, as well, by suitably selecting and setting a target engine rotational speed. In a clutch-to-clutch shift, the engaging and releasing timings may deviate from each other randomly and therefore, the speed shift control apparatus and method of the present invention can be suitably applied to any such shift. However, the speed shift control apparatus and method of the present invention are not limited to a clutch-to-clutch shift, but are also applicable to other shifts, for example, shifts that involve operation of a one-way clutch, and the like.

While the invention has been described with reference to what is presently considered to be a preferred embodiment thereof, it is to be understood that the invention is not limited to the disclosed embodiment or constructions. On the contrary, the invention is intended to cover various modifications and equivalent arrangements.

What is claimed is:

1. A control apparatus for speed shift control of an automatic transmission in which a speed shift is performed based on satisfaction of a predetermined speed shift condition, the control apparatus comprising:

speed shift determining means for outputting a speed shift determination responsive to satisfaction of the predetermined speed shift condition;

speed shift executing means for executing an actual speed shift based on the output speed shift determination;

shift initiation-time engine rotational speed detecting means for determining a time at which the actual execution of the speed shift is initiated, and for detecting an engine rotational speed at the time of the initiation of the speed shift, wherein said shift initiation-time engine rotational speed detecting means compares an input rotational speed of the automatic transmission with a value obtained by multiplying an output rotational speed of the automatic transmission by a gear ratio of a pre-shift speed stage, determines initiation of the speed shift when said input rotational speed becomes less than said value, and detects the engine rotational speed at the time of initiation of the speed shift; and learning-correcting means for correcting the predetermined speed shift condition by comparing the engine rotational speed at the time of initiation of the speed shift with a target engine rotational speed.

2. A control apparatus according to claim 1, further comprising a shift map of vehicle speed versus engine output demand, with vehicle shift speeds plotted thereon, and wherein the satisfaction of the speed shift condition is determined by reference to said shift map; and wherein the learning-correcting means corrects a vehicle shift speed read from said map in such a direction as to decrease the vehicle shift speed if the engine rotational speed at the time of initiation of the speed shift is greater than the target engine rotational speed, and the learning-correcting means corrects the vehicle shift speed in such a direction as to increase the vehicle shift speed if the engine rotational speed at the time of initiation of the speed shift is less than the target engine rotational speed.

3. A control apparatus according to claim 2, wherein the learning-correcting means corrects the vehicle shift speed by increasing or reducing a correction value for the vehicle shift speed by a predetermined amount each control cycle.

4. A control apparatus according to claim 3, wherein the speed shift executing means executes the speed shift by releasing a friction engagement element while engaging another friction engagement element.

5. A control apparatus according to claim 2, wherein the speed shift executed by the speed shift executing means is an upshift executed when maximum engine output is demanded.

6. A control apparatus according to claim 5, wherein the speed shift executing means executes the speed shift by releasing a friction engagement element while engaging another friction engagement element.

7. A control apparatus according to claim 2, wherein the speed shift executing means executes the speed shift by releasing a friction engagement element while engaging another friction engagement element.

8. A control apparatus according to claim 1, wherein the speed shift executing means executes the speed shift by releasing a friction engagement element while engaging another friction engagement element.

9. A method for speed shift control of an automatic transmission in which a speed shift is performed responsive to satisfaction of a predetermined speed shift condition, the control method comprising:

outputting a speed shift command responsive to satisfaction of the predetermined speed shift condition;

executing an actual speed shift responsive to the speed shift command;

determining a time at which actual execution of the speed shift is initiated by comparing an input rotational speed of the automatic transmission with a value obtained by multiplying an output rotational speed of the automatic transmission by a gear ratio of a pre-shift speed stage;

detecting an engine rotational speed at the determined time of the initiation of the speed shift; and correcting the predetermined speed shift condition by comparing the engine rotational speed at the time of initiation of the speed shift with a target engine rotational speed.

10. A method according to claim further comprising:

determining satisfaction of the speed shift condition by reference to a shift map of vehicle speed versus engine output demand, with vehicle shift speeds plotted thereon; and wherein said correcting corrects a vehicle shift speed read from said map in such a direction as to decrease the vehicle shift speed if the engine rotational speed at the time of initiation of the speed shift is greater than the target engine rotational speed, and in such a direction as to increase the vehicle shift speed if the engine rotational speed at the time of initiation of the speed shift is less than the target engine rotational speed.

11. A method according to claim 10, wherein said correcting corrects the vehicle shift speed by increasing or reducing a correction value for the vehicle shift speed by a predetermined amount each control cycle.

12. A control apparatus according to claim 11, wherein said executing releases one friction engagement element while engaging another friction engagement element.

\* \* \* \* \*

UNITED STATES PATENT AND TRADEMARK OFFICE
CERTIFICATE OF CORRECTION

PATENT NO.   : 6,684,144 B2
DATED        : January 27, 2004
INVENTOR(S)  : Sekii et al.

It is certified that error appears in the above-identified patent and that said Letters Patent is hereby corrected as shown below:

Column 13,
Line 5, after "claim" insert -- 9 --.

Signed and Sealed this

Twelfth Day of October, 2004

JON W. DUDAS
*Director of the United States Patent and Trademark Office*